United States Patent [19]

Read

[11] 4,181,044
[45] Jan. 1, 1980

[54] DRIVE TRANSMISSION SYSTEM

[76] Inventor: Reginald R. Read, 48, Fairway, Hemel Hempstead, Hertfordshire, England

[21] Appl. No.: 793,853

[22] Filed: May 4, 1977

[30] Foreign Application Priority Data

May 4, 1976 [GB] United Kingdom ............... 18287/76

[51] Int. Cl.² ............................................. F16H 3/74
[52] U.S. Cl. .................................................. 74/752 E
[58] Field of Search ................. 74/751, 752 E, 752 B, 74/793

[56] References Cited

U.S. PATENT DOCUMENTS

| | | | |
|---|---|---|---|
| 2,118,423 | 5/1938 | Timmermann | 74/752 E |
| 2,292,079 | 8/1942 | Joyce | 74/751 |
| 2,500,763 | 3/1950 | Lowndes | 74/752 E |
| 2,972,909 | 2/1961 | Miller | 74/751 |
| 3,130,606 | 4/1964 | Kreis | 74/751 |
| 3,939,734 | 2/1976 | Blanchette et al. | 74/752 E |

*Primary Examiner*—C. J. Husar
*Assistant Examiner*—Lance W. Chandler

[57] ABSTRACT

A drive transmission system having input and output shafts inter coupled by an idler gear arrangement which provides us in a constant meshing relationship with the input and output shafts. A load responsive device on the output shaft allows controlled relative movement between the output shaft and the idler system such that the drive ratio of the transmission system is related to the load on the output shaft.

5 Claims, 4 Drawing Figures

DRIVE TRANSMISSION SYSTEM

BACKGROUND OF THE INVENTION

Field of the Invention

This invention relates to drive systems and is more particularly concerned with a drive transmission system which is able to provide a load responsive gear ratio selection for at least a part of the range of gear ratios of the system.

It is an object of the invention to provide an improved form of load responsive gear drive system.

SUMMARIES OF THE INVENTION

Broadly, according to a first aspect of the invention there is provided a drive transmission system including a drive input shaft, a drive output shaft, at least one idler shaft having gears continuously meshing with gears respectively associated with the input and output shafts, each said idler shaft being carried by support means mounted for rotation about an axis parallel to the axes of rotation of the gears associated with the input and output shafts, and load responsive means for enabling the operational ratios of the system to be varied according to load at the output shaft, said load responsive means being such that, a when the load on the output shaft is less than a predetermined level the input and output shafts, each idler shaft and the rotable support are constrained to rotate as a single unit thereby to provide a first gear ratio, b when the load is greater than a predetermined second level, higher than the first mentioned level, free relative rotation is enabled between input and output shafts and the idler shafts and the rotatable support thereby to define a second gear ratio, and, c when the load is between the first and second levels a load responsive relative movement is permitted between the support means and the output shaft thereby to define intermediate drive ratios characteristic of the particular load.

Preferably, a freewheel unit is connected between the input shaft and the rotatable means for supporting the idler shaft(s), the freewheel arrangement being such as to allow free rotation of the support means in the direction of rotation of the input shaft and to prevent rotation in the reverse direction.

Preferably, the load responsive means includes first and second displaceable members which co-operate to provide co-operating cylindrical faces, said members being constrained to rotate with the output shaft, and a resiliently loaded wedge system controlling the transfer of drive between the input shaft and the output shaft.

In a preferred construction the co-operating surfaces are formed by facing cylindrical surfaces having axes parallel to that of the rotatable support means, and the wedge system includes at least one cam face on one of the cylindrical faces, a cam follower means projecting from the other of the surfaces, and spring means responsive to load on the output shaft to control the engagement of the follower means with the cam face.

A further aspect of the invention provides a variable speed gear transmission system including a drive transmission system comprising, input gear means; output gear means; means providing a drive connection between the input and output gear means; means responsive to load on the output gear means for controlling drive transmission between the input and output gear means in such manner that when the load is below a predetermined first value a first drive ratio is provided between the input and output gear means, when the load is above a second predetermined value greater than the first value a second drive ratio is provided between the input and output drive means, and when the load is at an intermediate value between the first and second values an intermediate drive ratio appropriate to the load value is provided between the input and output gear means.

BRIEF DESCRIPTION OF THE DRAWINGS

For a better understanding of the invention and to show how to carry the same into effect reference will now be made to the accompanying drawings in which.

DESCRIPTION OF THE PREFERRED EMBODIMENTS

Before considering the gear system of the invention in detail in relation to the drawings it is convenient to consider the basic aspects of the system. The principal purpose of the gear system is to provide transmission system in the form of a gear box which has a top gear for example, of a 1::1 ratio and a low gear ratio of for example 4::1 and which provides a variable ratio drive throughout the transition between the top and bottom gear whilst maintaining a positive, that is meshed gear, drive throughout all drive states in and between the above mentioned high and low gears.

Figure 1:
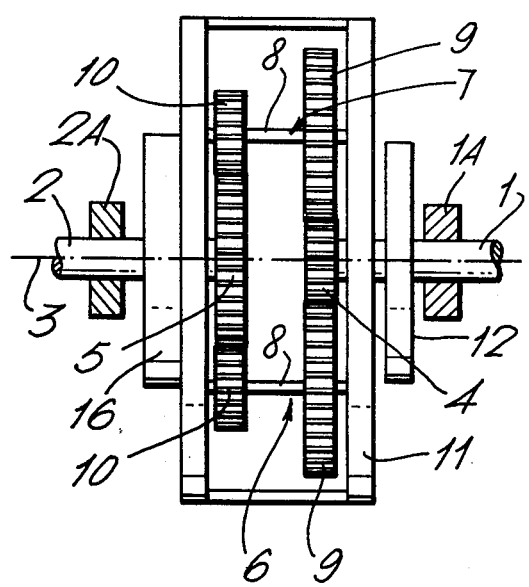
FIG. 1 is a schematic representation of part of a gear drive transmission system incorporating the features of the invention.

Turning now to consideration of the drawings in the FIG. 1 a drive shaft 1 and a driven shaft 2 are rotably mounted in bearing arrangements 1A and 2A respectively which enable the two shafts to rotate about a common axis 3.

A first gear 4 is provided at the end of the input shaft 1, this gear having (for example) N teeth. A second gear 5 is provided upon the driven shaft 2, the gear 5 having (for example) 2N teeth. Drive is taken from the gear 4 to the gear 5 by way of a pair of side or idler shaft units 6 and 7, each such units including a shaft 8 and gears 9 and 10. To provide the desired drive each of the gears 9 has 2N teeth and the gears 10 have N teeth.

It will be clear that with this arrangement as so far described the output shaft can be driven at four times that of the input shaft by reason of the 2:1 ratio between the gears 4 and 9 and the 2:1 ratio between the gears 5 and 10.

It will be noted that the stated drive ratio can be achieved by means of a single idler unit. However, for the purposes of maintaining a balanced configuration it is preferred to use at least two idler units.

As so far described the gear box includes in line input and output shafts in conjunction with parallel idler units for transferring drive between the input and output shafts.

Each shaft 8 is each journalled in an idler housing 11 which is rotatably mounted so as to be able to under-go co-axial rotation about the axis 3 and relative to the drive shaft 1 and the driven shaft 2.

With the gear box as so far considered, if the drive shaft 1 is rotated it will be found that the housing 11 commences to rotate in the opposite direction. This rotation arises from the fact that any resistance to the rotation of the driven shaft 2 such as would be produced by a load produces a reverse drive action which causes the idler gear units 6 and 7 to rotate on the driven shaft.

In order to prevent this rotation a free wheel unit 12 is provided upon the drive shaft at the drive shaft end of the idler housing 11. The outer part of the freewheel unit is secured to the static housing 14 of the gear box and the inner part of the freewheel is secured to the housing 11. With this arrangement the idler housing 11 is able only to rotate in one direction with respect to the driven shaft. It will be appreciated that the freewheel unit 12 prevents rotation of the housing 11 in the opposite direction to the rotation of the shaft 1.

To obtain the high gear ratio of 1:1 it is necessary effectively to lock the idler housing 11, and the shafts 1 and 2 together in such manner that they effectively provide a single rotatable unit in which all of these components rotate simultaneously together in the freewheel direction of the unit 12.

This is achieved by providing a resiliently loaded drive locking arrangement 16 between the housing 11 and the driven shaft 2 which operates such that when the resistance to rotation of the driven shaft 2 is less than a predetermined load level the locking arrangement locks the idler housing 11 to the driven shaft 2 so that the latter is constrained against rotation with respect to the drive shaft 1. This is normally the low or no load setting of the locking arrangement. When the resistance to the rotation of the driven shaft is above said predetermined load level the locking arrangement 16 provides a controlled relative rotation which in effect creates a variable gear ratio between the 4:1 and the 2:1 ratios whilst maintaining a continuous gear drive between the drive and driven shafts. In addition, the locking arrangement is such that when the load level reaches a second predetermined level (higher than the first level) the locking arrangement is fully open thereby allowing the higher ratio of 4:1.

Figure 3:
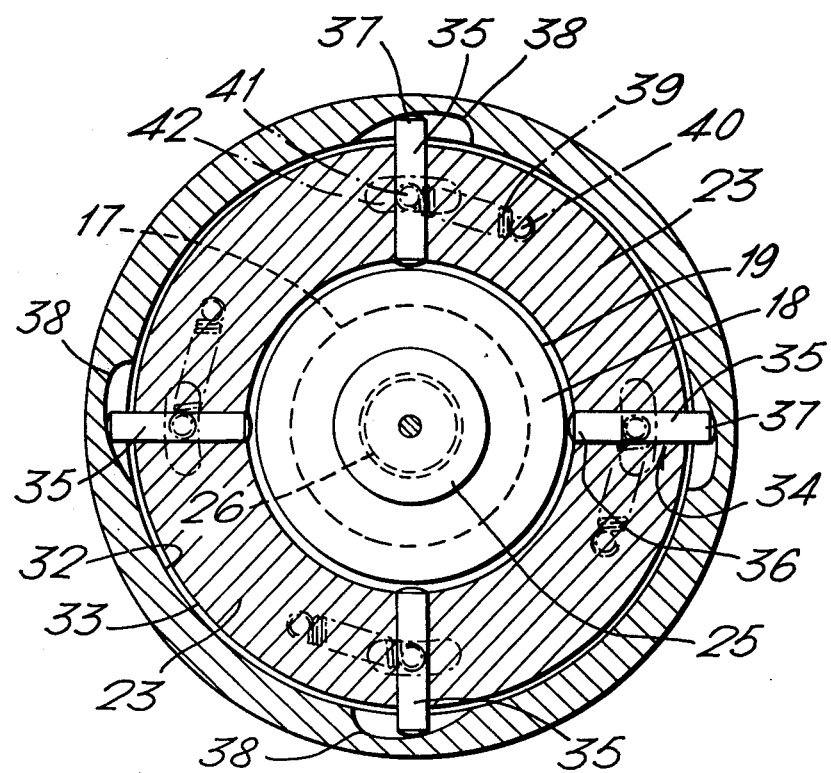
Figure 2:
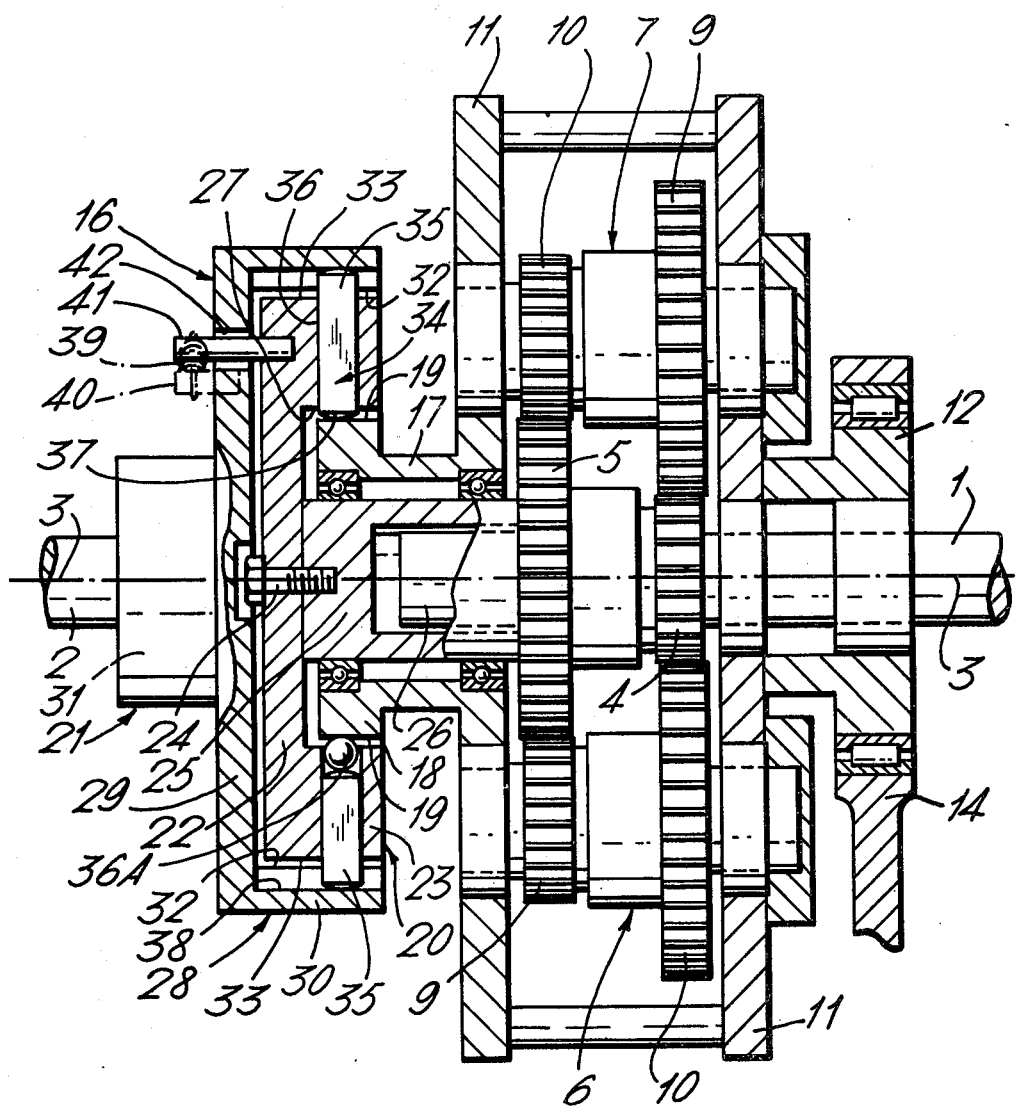
FIG. 2 is a sectional side view of a first embodiment of the transmission system of the invention, FIG. 3 schematically represents a detail of the transmission system of FIGS. 1 and 2, and FIG. 4 schematically illustrates a further detail for a transmission system of the invention.

The arrangement will be considered in greater detail in connection with FIGS. 2 and 3. The general arrangement of the gear box of FIG. 2 is essentially similar to that shown in FIG. 1, and similar components will be identified with the same reference numerals. It is to be noted that the arrangement of FIG. 2 is that of an actual construction of the gear box so that certain of the components are depicted in considerable detail.

The idler housing 11 is provided with a sleeve 17 which is co-axial with the output shaft 2. The sleeve 17 terminates in an outwardly directed flange 18 providing a cylindrical surface 19. In the gear box construction of FIG. 2 the output or device or driven shaft 2 is effectively separated from a drive point of view into two principal sections 20 and 21 which are in practice operatively connected by the load responsive locking arrangement 16.

The section 20 includes a plate 22 having an axially directed flange 23 which is attached by a bolt 24 to the end of a hollow stub shaft 25 which forms part of the driven shaft 2. For convenience the end 26 of the drive shaft 1 is journalled within the hollow stub shaft 25. The inner cylindrical surface 27 of the flange faces the cylindrical surface 19.

The second section 21 of the driven shaft 2 terminates in a shallow cup-like housing 28 having a base 29 with a peripheral axially directed flange 30 which surrounds the flange 23. The base 29 connects with a boss 31 which is secured to the shaft 2.

The internal cylindrical surface 32 of the flange 30 faces the outer cylindrical surface 33 of the flange 23.

The driven shaft sections 20 and 21 are supported by bearing means (not shown) provided in a housing for the gear box. For clarity this housing is not shown since its construction will clearly be related to the particular application of the gear box. The flanges 30 and 23 are relatively rotatable with respect to each other. In other words the sections 20 and 21 are drive-wise separated at the flanges 23 and 30. A driving connection between the sections 20 and 21 is provided by a wedging system 34 including non-circular cam or locking pins 35 slidably engaging in bores 36 provided in the flange 23. The inner ends 36 of the pins 35 co-operate with the surface 19 on the idler housing flange 18, whilst the outer ends 37 of the pins 35 co-operate with cam surfaces 38 formed in the surface 32 of the flange 30. These cam surfaces are shown in FIG. 3.

The cam surfaces are such that relative rotation in the clockwise direction of the FIG. 3 will push the pins 35 firmly against the idler housing flange surface 19 so that the housing 11 is effectively locked to the output shaft 2.

A resilient loading means indicated as springs 39 in FIG. 2 is provided for exerting a force on the sections 20 and 21 which ensures that the flanges 23 and 30 are normally locked together and to the flange 18 of the housing 11. It will be understood that other means could be used in place of the springs for example a hydraulic system.

As will be seen from FIG. 2 the springs 39 are connected between the plate 22 and the base 29 by means of spring retaining pins 40 and 41 which are engaged in the plate 22 and the base 29 respectively. The pin 40 engages in a bore in the base 29 whilst the pin or each pin 41 engage arcuate slots 42 in the base 29 and are secured to the plate 22. The purpose of the slots 42 is to permit the required relative angular displacement of the plate 22 and the base 29 and thus the sections 20 and 21 of the output shafts.

The tensioning of the springs 39 is such that the cam surfaces 38 are pulled to the position in which the cam pins 35 are pushed inwardly towards the flange 18 of the idler housing 11 thereby firmly locking the two sections of the output shaft to the idler housing 11 so that the latter rotates with the shaft. In other words, the springs 38 provide the basic unloaded setting for the load responsive means.

When the load on the shaft 2 is less than the resilient loading produced by the springs 39 the wedge system is in its locked position. If the load on the shaft increases to a value that exceeds the force exerted by the springs 39 the flange 30 is moved relative to the flange 23 and in so doing displaces the cam surfaces 38 anticlockwise relative to the cam pins 35 thereby allowing slip to take place between the cam pins 35 and thus the idler housing flange 18 and the driven shaft 2. The amount of this slip controls the rate at which the idler housing can rotate with the drive shaft 1 and thus varies the gear ratio.

When the load on the output shaft 2 reaches the level at which the effect of the springs is wholly overcome the flanges 30 and 23 are able to rotate freely relative to the housing flange 18 so as to obtain the full effect of the gear system and thus obtain the low gear ratio.

It will be apparent that the shape of the cam surfaces will govern the values of the intermediate gear ratios in relation to the load on the output shaft.

In practice the ends 35 will be shaped so as to provide a desired contact with their associated surfaces 32 and 19 and thus attain optimum performance.

For example, the ends 37 can be suitably rounded to provide a substantially bevelled end whose axis is parallel to the axis of rotation of the associated flange surface.

If desired the inner ends of the pins could co-operate with a roller which in turn engages with the surface 19. This variation is shown in the bottom part of FIG. 2 the roller having the reference 36A.

Figure 4:
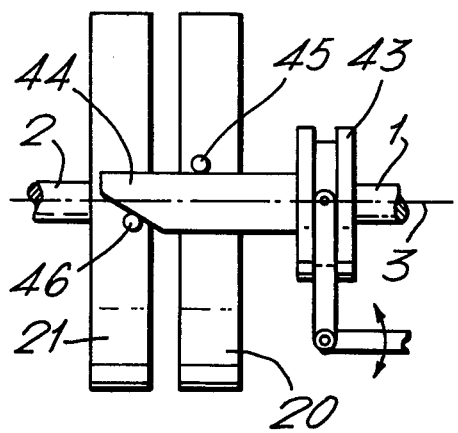

FIG. 4 illustrates schematically a method of providing a manual control which makes it possible to hold or select either of the high or low gear ratios. This can be attained by providing a slidable sleeve 43 on the drive shaft 1, the sleeve carrying a wedge or tooth element 44 which is engageable with pins 45 and 46 on the driven shaft sections 20 and 21 in such manner that a manual over-ride is obtained over the resilient loading effected by the springs 39.

If it is required to provide a neutral gear setting for the gear box the freewheel unit 12 can be constructed so that the locking effect can be selectively removed to allow the unit to undergo free rotation in both directions.

If desired a freewheel unit can be provided at the drive shaft ends of each of the shafts 8. These can be additional to the unit associated with the drive shaft or an alternative to the drive shaft unit. These additional freewheel units serve to correct for any overdrive arising from the driven housing being caused to move faster than the drive.

The gear drive transmission of the present invention is particularly suitable for use in connection with spin driers, vehicles, bicyles, compressors, star delta motors and various other applications.

It will be understood that in a modified construction the elements 17 and 16 can be so constructed that the relative positions of the flanges 18 and 30 are reversed. That is the flange 18 is modified so as to overlap the flange 30.

I claim:

1. A drive transmission system including a supporting structure; input and output driving shafts supported for rotation in the structure in alignment on a common axis; an input sun gear secured to the input shaft; an output sun gear secured to the output shaft; a housing mounted for rotation about the common axis; at least one idler shaft supported in the housing; a pair of planet gears both secured to the idler shaft and meshing respectively with the input and output sun gears, the relative sizes of the sun and planet gears being selected to provide a step-down gear ratio from input to output; a free-wheel unit between the housing and the supporting structure arranged to restrain the housing from rotation in a direction opposite that of the input shaft; and a coupling responsive to the output load between the housing and the output shaft, the coupling including a cylindrical first member secured to the housing, the cylindrical axis of the member coinciding with the common axis; a cup-like flanged second member secured to the output shaft, the second member having a flange portion extending in an axial direction over the peripheral cylindrical surface of the first member, the interior surface of the flange portion having at least one cam-shaped recess extending in a peripheral direction; means for supporting a wedge member in alignment between the recess of the second member and the periphery of the first member, the supporting means being displaceable in a circumferential direction relative to the second member from one position in which the shape of the recess causes the wedge member to engage both first and second members to a second position in which the wedge member is completely free from such engagement and means for biassing the support means in a direction opposite that of rotation of the driving shafts to bring the wedge member into said one position.

2. A drive transmission system as claimed in claim 1, having a plurality of idler shafts supported in the housing, the shafts being spaced symmetrically around the common axis, each shaft having a pair of planet gears.

3. A drive transmission system as claimed in claim 1, in which the support means is a further cupped member having a peripheral portion extending between the periphery of the first member and the interior of the flange of the second member, and in which said peripheral portion supports the wedge member.

4. A drive transmission system as claimed in claim 3 in which the second member has a plurality of cam-shaped recesses spaced symmetrically around its interior surface and the support means carries a wedge member for each recess.

5. A drive transmission system as claimed in claim 3, further including means for over-riding the action of the biassing means.

* * * * *